(12) United States Patent
Boerhof et al.

(10) Patent No.: US 11,008,183 B2
(45) Date of Patent: May 18, 2021

(54) AIR FLOW SYSTEM FOR WASTE TREATMENT SYSTEMS

(71) Applicant: Bollegraaf Patents and Brands B.V., Appingedam (NL)

(72) Inventors: Henk Boerhof, Appingedam (NL); Johannes Sijbrand Vogelaar, Appingedam (NL)

(73) Assignee: Bollegraaf Patents and Brands B.V., Appingedam (NL)

( * ) Notice: Subject to any disclaimer, the term of this patent is extended or adjusted under 35 U.S.C. 154(b) by 0 days.

(21) Appl. No.: 16/669,618

(22) Filed: Oct. 31, 2019

(65) Prior Publication Data

US 2020/0140200 A1 May 7, 2020

(30) Foreign Application Priority Data

Nov. 1, 2018 (NL) .................................... 2021915

(51) Int. Cl.
| | |
|---|---|
| *B65G 53/58* | (2006.01) |
| *B65G 21/20* | (2006.01) |
| *B65G 53/44* | (2006.01) |
| *F04D 29/54* | (2006.01) |
| *F04D 25/16* | (2006.01) |

(Continued)

(52) U.S. Cl.
CPC ............ *B65G 53/58* (2013.01); *B65G 21/20* (2013.01); *B65G 21/209* (2013.01); *B65G 53/44* (2013.01); *F04D 19/002* (2013.01); *F04D 25/166* (2013.01); *F04D 29/547* (2013.01); *F04D 29/703* (2013.01); *F05D 2250/52* (2013.01)

(58) Field of Classification Search
CPC ...... B65G 21/20; B65G 21/209; B65G 51/03; B65G 53/44; B65G 53/58; F04D 19/002; F04D 25/166; F04D 29/547; F04D 29/703; F05D 2250/52

See application file for complete search history.

(56) References Cited

U.S. PATENT DOCUMENTS

| | | | | |
|---|---|---|---|---|
| 5,297,667 A | * | 3/1994 | Hoffman ............ | B65G 21/2054 198/493 |
| 10,131,507 B1 | * | 11/2018 | Doak .................... | B65G 51/02 |

(Continued)

FOREIGN PATENT DOCUMENTS

| | | |
|---|---|---|
| GB | 1 236 237 A | 6/1971 |
| WO | 03/061858 A1 | 7/2003 |

*Primary Examiner* — Gene O Crawford
*Assistant Examiner* — Keith R Campbell
(74) *Attorney, Agent, or Firm* — N.V. Nederlandsch Octrooibureau; Catherine A. Shultz; Katelyn J. Bernier

(57) ABSTRACT

An airflow system for a waste conveyor, having a conveyor enclosure with a bottom side configured for being mounted above a conveyor surface. One or more air flow unit enclosures are mounted to the conveyor enclosure. Each air flow unit enclosure has a divergent channel with a channel intake end fluidly connected to the air exhaust and a channel discharge end configured for providing a stream of air (Q) toward the conveyor surface. The divergent channel has a widening cross section (Xd) in a downstream air direction (D) between the channel intake end and the channel discharge end of the divergent channel, and is arranged at an angle ($\alpha$) larger than 0° and smaller than 45° degrees with respect to the bottom side of the conveyor enclosure.

14 Claims, 2 Drawing Sheets

(51) Int. Cl.
*F04D 29/70* (2006.01)
*F04D 19/00* (2006.01)

(56) References Cited

U.S. PATENT DOCUMENTS 10,246,273 B2 *   4/2019   Sardella .................. D21F 7/006
2015/0375267 A1   12/2015  Andersen

* cited by examiner

AIR FLOW SYSTEM FOR WASTE TREATMENT SYSTEMS

FIELD OF THE INVENTION

The present invention relates to an air flow system for waste treatment systems, in particular a laminar flow system for waste conveyance. In a further aspect the present invention relates to a method of waste conveyance.

BACKGROUND ART

Prior art waste handling and sorting systems may utilize conveyor belts for transporting waste items from one location to another. However, in many cases the transport speed of conveyor belts is limited as contact of the waste items with conveyor belts may be lost due to air resistance, leading to suboptimal system performance or even malfunction. Loss of traction on waste items is particularly problematic for light weight waste items such as plastic or paper waste items. As the transport speed of waste items is limited, overall system capacities and throughput remains limited as well.

International patent publication WO03/61858 discloses a method and apparatus for identifying and sorting objects, such as (plastic) waste, wherein a flow of objects is transported by a conveyor belt.

US patent publication US2015/0375267 discloses a sorting system of automobile shredder residue allowing recovery of recyclable materials, using an air sorting system in which shredded material is subjected to a laminar air flow for carrying material bits to bins positioned at varying distance.

U.S. Pat. No. 5,297,667 discloses a stabilizing system that stabilizes articles carried on conveyors for automated bulk processing equipment. In a preferred embodiment, a flow of gas (e.g., air) is projected along a conveyor belt in a direction generally parallel to that in which articles are carried by the belt.

SUMMARY OF THE INVENTION

The present invention seeks to provide an improved air flow system for waste treatment systems, in particular a laminar flow system for waste conveyance, wherein the air flow system allows for a significant increase in transportation speed of waste items using a conveyor belt by reducing loss of traction on waste items, thereby increasing system throughput and reliability. The air flow system of the present invention is modular, expandable and easy to service and maintain.

According to the present invention, an air flow system of the type defined in the preamble is provided, wherein the air flow system comprises a conveyor enclosure having a bottom side configured for being mounted above a conveyor surface at a predetermined surface clearance, which then defines a waste clearance space between the bottom side of the conveyor enclosure and the conveyor surface. The air flow system further comprises one or more air flow unit enclosures mounted to the conveyor enclosure, wherein each air flow unit enclosure comprises an air flow unit, e.g. a fan/turbine, having an air intake and an air exhaust. Each air flow unit enclosure comprises a divergent channel provided with a channel intake end which is fluidly connected to the air exhaust and a channel discharge end which is configured for expelling or ejecting air toward the conveyor surface.

The divergent channel of each air flow unit enclosure comprises a widening cross section in a downstream direction between the channel intake end and the channel discharge end of the divergent channel, wherein the divergent channel is arranged at an angle larger than 0° and smaller than 45° degrees with respect to the bottom side of the conveyor enclosure.

According to the present invention, when the air flow system is in operation the divergent channel of each air flow unit enclosure provides a stream of air over/to waste items arranged on the conveyor surface, wherein the stream of air has a velocity component which is substantially parallel to the conveyor surface and has a magnitude which is substantially equal to a speed of the conveyor surface. This allows waste items on the conveyor surface to move in unison therewith at much greater speeds whilst experiencing no discernibly air resistance as the stream of air expelled by the channel discharge end of each divergent channel moves in unison with the waste items and conveyor surface.

By allowing the widening cross section of the divergent channel to change in particular fashion, and together with the angle at which the divergent channel is arranged with respect to the bottom side of the conveyor enclosure, allows a stream of air to be provided which may be mostly laminar over the waste items such that the aforementioned velocity component is increasingly parallel to the conveyor surface exhibiting minimal turbulence. As are result, waste items travel in unison with the mostly laminar air and remain planted on the conveyor surface for much higher speeds thereof.

One of the major advantages of the air flow system of the present invention is that light weight waste items, such as light plastic or paper foils having a relatively large surface area, can be conveyed with considerably higher speeds than heretofore possible.

BRIEF DESCRIPTION OF DRAWINGS

The present invention will be discussed in more detail below, with reference to the attached drawings, in which.

DETAILED DESCRIPTION OF EMBODIMENTS

Figure 1:
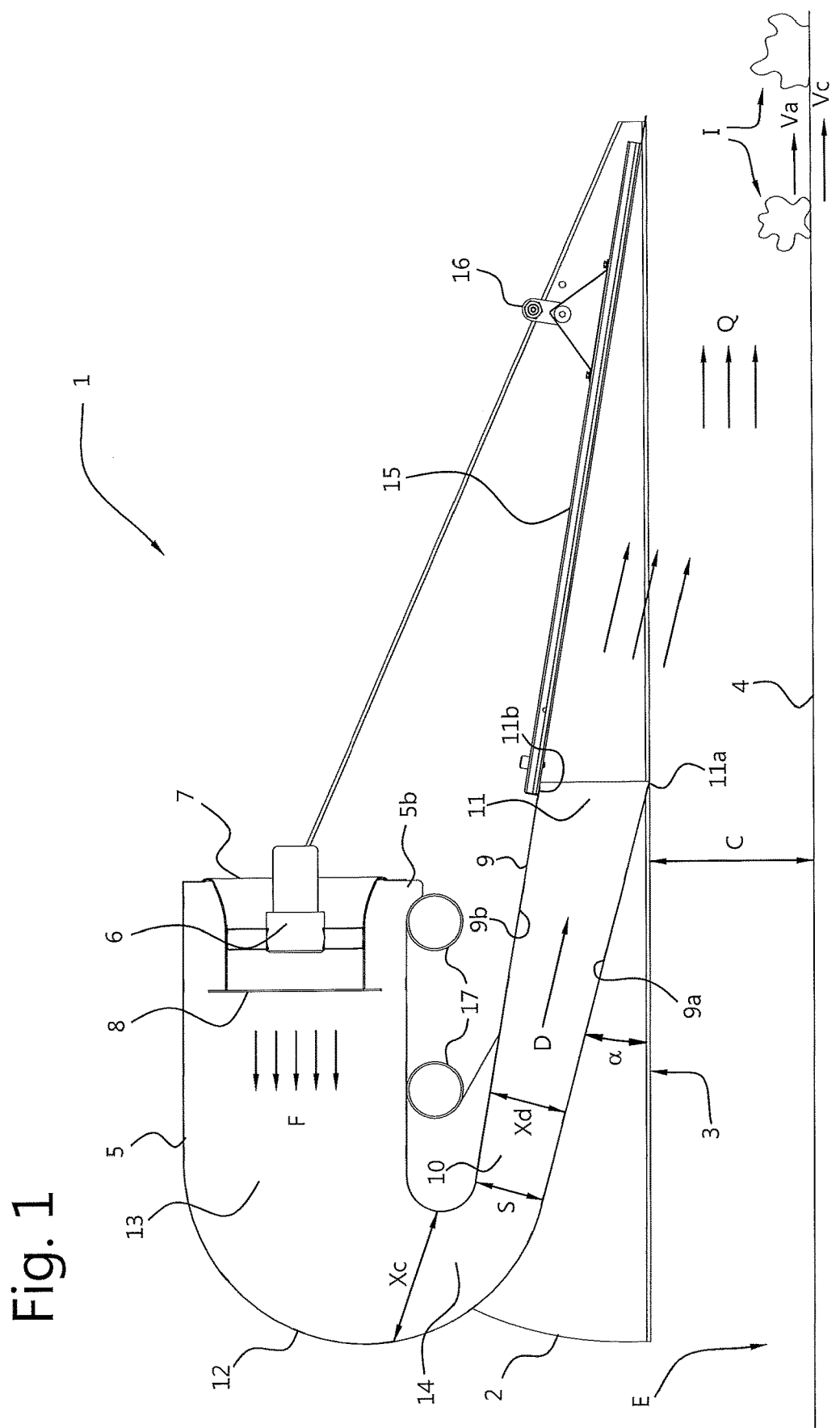
FIG. 1 shows a cross section of an air flow system according to an embodiment of the present invention.

FIG. 1 shows a cross section of an air flow system 1 for a waste conveyor according to an embodiment of the present invention. In the embodiment shown, the airflow system 1 comprises a conveyor enclosure/housing 2 having a bottom side 3 which is configured for being mounted above a (moveable) conveyor surface 4 at a predetermined surface clearance C with respect thereto. The surface clearance C defines a waste clearance space between the conveyor enclosure 2 and the conveyor surface 4 through which waste items can be conveyed.

The air flow system 1 further comprises one or more air flow unit enclosures 5, or flow enclosures 5 for short, mounted to the conveyor enclosure 2, wherein each air flow unit enclosure 5 comprises an air flow unit 6 having an air intake 7 and air exhaust 8. In an embodiment, each air flow unit 6 may be a fan or turbine capable of providing an air flow "F" through the air exhaust 8.

Each air flow unit enclosure 5 comprises a divergent channel 9 having a channel intake end 10 fluidly connected to the air exhaust 8 and a channel discharge end 11 which is configured to provide a stream of air "Q" toward the conveyor surface 4, e.g. toward the waste items I.

As depicted, the divergent channel 9 comprises a widening cross section "$X_d$", e.g. a vertically or height wise widening cross section $X_d$, in a downstream direction "D" between the channel intake end 10 and the channel discharge end 11 of the divergent channel 9. Also, the divergent channel 9 is further arranged at an angle α which is larger than 0° and smaller than 45° degrees with respect to the bottom side 3 of the conveyor enclosure 2.

According to the present invention, in operation the air flow system 1 and in particular the divergent channel 9 of each air flow unit enclosure 5 provides a stream of air "Q" over/to waste items I, wherein the stream of air Q has a velocity component $V_a$ which is substantially parallel to the conveyor surface 4 and has a magnitude which is substantially equal to a speed $V_c$ of the conveyor surface 4. This allows waste items I on the conveyor surface 4 to move in unison therewith at much greater speeds Vc whilst experiencing no discernibly air resistance as the stream of air Q expelled/ejected by the channel discharge end 11 of each divergent channel 9 substantially moves in unison with the waste items I and conveyor surface 4. For illustrative purposes, the air flow system 1 is configured to provide the stream of air Q which may be viewed as being an "air bubble" which remains by and large stationary with respect to the waste items I while travelling, so that for any given speed Vc of the conveyor surface 4 the waste items I experience a minimum of air drag and as such remain planted on the conveyor surface 4.

As the divergent channel 9 is arranged at the indicated angle α (0°-45°) with respect to the bottom side 3 of the conveyor enclosure 2, allows for a stream of air Q which is mostly laminar so that the aforementioned velocity component $V_a$ is mostly parallel to the conveyor surface 4.

Due to the angled divergent channel 9 and the mostly laminar flow provided by the stream of air Q it is possible to double or even quadruple conveyor speeds Vc not theretofore possible. For example, conveyor speeds $V_c$ of 2, 3, 4, 5 m/s or higher are possible with the air flow system 1 of the present invention. Most notably, the air flow system 1 of the present invention is ideally suited for light weight waste items I, such as plastic or paper based packaging items, plastic foils etc. Plastic foils in particular have large surface dimensions relative to their weight and as such plastic foils typically experience high levels of air drag when moved by a conveyor surface 4 as depicted in FIG. 1. Through the divergent channel 9 as outlined above the (laminar) stream of air Q travelling at substantially the same speed $V_c$ in the direction of the conveyor surface 4 eliminates air drag on waste items I so that the conveyor speed $V_c$ can be increased significantly when the velocity component Va of the stream of air Q is increased equally.

In an embodiment, the divergent channel 9 may be a straight divergent channel 9 to facilitate laminar character of the stream of air Q to further minimize air drag on waste items I and as such allow higher conveyor speeds $V_c$.

When the divergent channel 9 is a straight divergent channel it may be envisaged that air flowing there through substantially follows a straight flow path, which may support development of a mostly laminar stream of air Q. In an exemplary embodiment, the divergent channel 9 may comprise one or more side walls 9a, 9b that are substantially flat (or all side walls 9a, 9b may be substantially flat), thereby contributing to a straight flow path and hence a laminar stream of air Q.

In an alternative embodiment, the divergent channel 9 may be a curved divergent channel, thus wherein air flowing there through substantially follows a curved flow path. This embodiment may allow further optimization of the stream of air Q to be provided over the waste items I to allow fast conveyance thereof. In an exemplary embodiment, the divergent channel 9 may comprise one or more side walls 9a, 9b that are at least partially curved or arched (or all side walls 9a, 9b may be curved/arched), e.g. in a width and/or the downstream direction D of the divergent channel 9, thereby allowing alternative optimization of the stream of air Q to be provided over waste items I.

Note that in further embodiments the one or more side walls 9a, 9b of the divergent channel 9 need not have smooth inner and/or outer surfaces, i.e. the one or more side walls 9a, 9b may comprise ribbed or undulated inner and/or outer surfaces to provide structural stiffness and/or reduce vibrations, noise etc.

To maintain the surface clearance C between the bottom side 3 of the conveyor enclosure 2 and the conveyor surface 4, an embodiment is provided wherein a bottom edge 11a of the channel discharge end 11 of the divergent channel 9 is flush with the bottom side 3 of the conveyor enclosure 2. In this embodiment the bottom edge 11a of the channel discharge end 11 is configured to terminate at the bottom side 3 and to be flush therewith, so that the waste clearance space defined by the surface clearance C is maintained without locally restricting the waste clearance space. Furthermore, having the bottom edge 11a of the channel discharge end 11 flush with the bottom side 3 minimizes turbulent air flow through the waste clearance space and as such facilitates achieving improved laminar flow of the stream of air Q over/to the waste items I.

In an advantageous embodiment, each air flow unit enclosure 5 further comprises a convergent channel 12 having a channel intake end 13 fluidly connected to the turbine exhaust 8 and a channel discharge end 14 connected to the channel intake end 10 of the divergent channel 9. The channel intake end 10 of the divergent channel 9 comprises a smallest cross section "S" of the convergent channel 12 and divergent channel 9. Note that the convergent channel 12 comprises a narrowing cross section "$X_c$" in the downstream direction D between the channel intake end 13 and the channel discharge end 14 of the convergent channel 12.

In this embodiment the convergent channel 12 induces increased air pressure or an air pressure built-up before the channel discharge end 14 of the convergent channel 12 when the air flow unit 6 is in operation. Due to the smallest cross section S of the channel intake end 10 of the divergent channel 9, the air flowing through the smallest cross section S accelerates resulting in a mostly laminar stream of air Q over/to the waste items I. In an embodiment the channel discharge end 14 of the convergent channel 12 may smoothly connect to the channel intake end 10 of the divergent channel 9 by also having the same smallest cross section S.

The convergent channel 12 and the diverging channel 9 in combination may be viewed as a "de Laval"-like nozzle and as such this embodiment provides each air flow unit enclosure 5 with a de Laval nozzle comprising the divergent channel 9 providing a laminar stream of air Q toward the conveyor surface 4 and waste items I arranged thereon.

In an advantageous embodiment, the convergent channel 12 is a U-turn convergent channel having a first end comprising the channel intake end 13 of the convergent channel 12 and a second end comprising the channel discharge end 14 of the convergent channel 12. The U-turn convergent channel 12 allows for a compact design of the air flow unit enclosures 5 whilst preventing waste items being sucked into the air intake 7 of an air flow unit 6 when waste items I are being dumped into an entry area "E" upstream of the conveyor surface 4 and conveyor enclosure 2.

Note that when the air flow system 1 and conveyer surface 4 are in operation, the conveyor surface 4 is considered to move toward the right as indicated by the arrow of the conveyor speed $V_c$. In light of this direction of operation, the terminology "upstream" of the conveyor surface 4 and conveyor enclosure 2 is to be construed as being on the left, whereas the term "downstream" of the conveyor surface 4 and conveyor enclosure 2 is to be construed as being on the right, e.g. where the waste items I are depicted.

In a further advantageous embodiment as depicted in FIG. 1, the convergent channel 12 may be a smoothly arched U-turn convergent channel, which reduces air turbulence within the convergent channel 12 but also improves guidance of waste items being duped into the entry area E toward the conveyor surface 4.

To further improve the laminar character of the stream of air Q at the waste items I, an embodiment is provided wherein the conveyor enclosure 2 comprises a deflection member 15 extending from an upper edge 11b of the channel discharge end 11 of the divergent channel 9 toward the bottom side 3 of the conveyor enclosure 2. In a further embodiment, the deflection member 15 is arranged at an angle substantially equal to the angle α of the divergent channel 9 to further guide air from the channels discharge end 11 of the divergent channel 9 toward the conveyor surface 4 and to further facilitate achieving a laminar stream of air Q.

In an embodiment, the deflection member 15 is pivotally connected to the conveyor enclosure 2, allowing access to the conveyor surface 4 as well as the air flow unit enclosures 5 for installation or removal thereof. The deflection member 15 may, for example, be pivotable about a hinge point 16 arranged at the conveyer enclosure 2 at a downstream location with respect to the channel discharge end 11 of the divergent channel 9.

Figure 2:
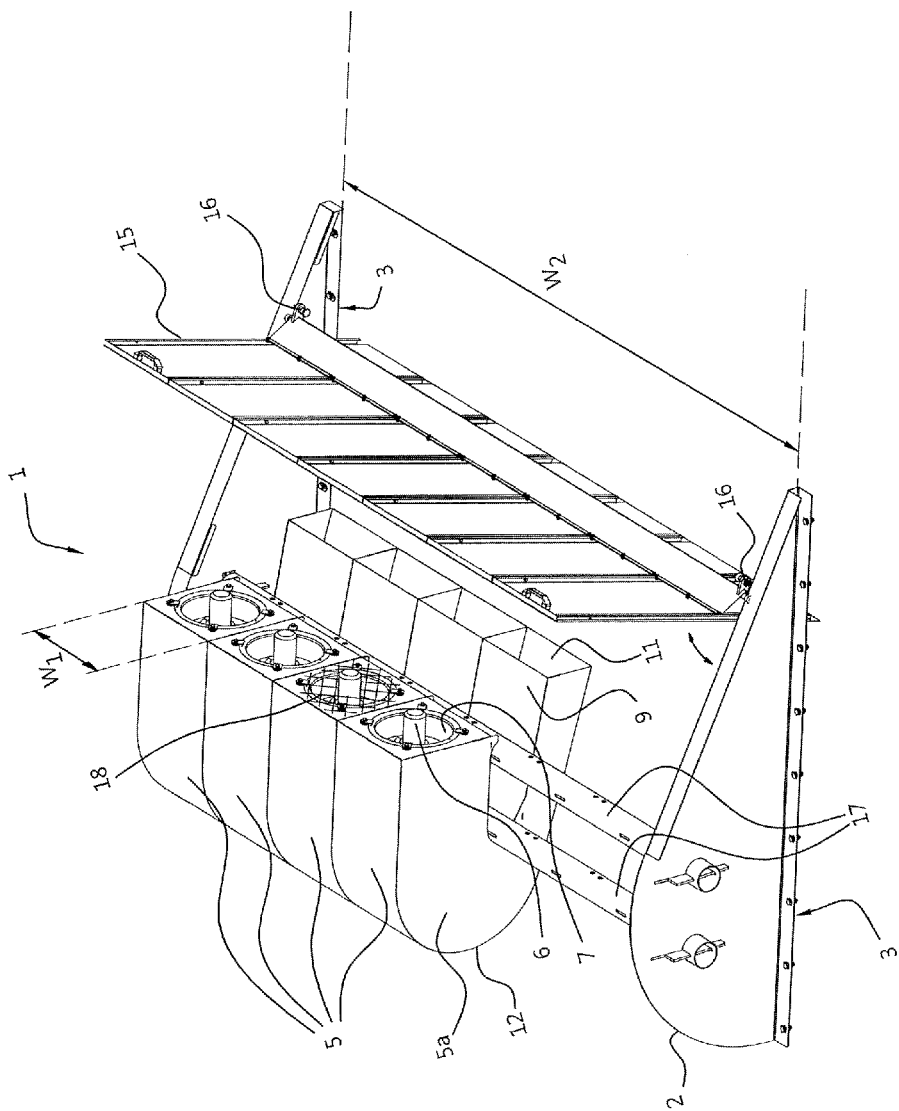
FIG. 2 shows a three dimensional view of an air flow system according to an embodiment of the present invention.

Turning to FIG. 2, in this figure a three dimensional view of the air flow system 1 is shown according to an embodiment of the present invention. In the embodiment the convergent channel 12 and divergent channel 9 may each have a rectangular cross section, allowing for a side-by-side arrangement of the one or more air flow unit enclosures 5, in particular a side-by-side arrangement of the divergent channels 9 of each air flow unit enclosure 5 yielding a wide and sideways continuous stream of air Q toward the conveyor surface 4 for optimal laminar flow at the waste items I. To further facilitate a side-by-side arrangement in snug and seamless fashion of the one or more air flow unit enclosures 5, there is an embodiment wherein each air flow unit enclosure 5 comprises substantially flat vertical side surfaces 5a, e.g. opposing vertical substantially flat side surfaces 5a, to allow direct and seamless abutment of two or more air flow unit enclosures 5 to achieve a snug side-by-side arrangement thereof.

Note that the widening cross section Xd of the divergent channel 9 may only be widening in vertical/height sense as the divergent channel 9 may have a constant width, for example, when in an embodiment each of the air flow unit enclosures 5 have a constant width $w_1$.

Since the one or more air flow unit enclosures 5 are mounted to the conveyor enclosure 2, it is desirable that the air flow system 1 can be expanded, upgraded and/or serviced easily. To that end there is an embodiment wherein each air flow unit enclosure 5 is mounted in removable fashion to the conveyor enclosure 2. To further facilitate such removable placement for expandability, upgradability and servicing of the air flow system 1, there is an embodiment wherein the conveyor enclosure 2 may comprise a support member 17 laterally extending across a width $w_2$ of the conveyor enclosure 2. This embodiment then allows air flow unit enclosures 5 to be mounted in a side-by-side arrangement along the width $w_2$ of the conveyor enclosure 2. For example, air flow unit enclosures 5 may advantageously be arranged on the support member 17 in sliding engagement therewith, e.g. sideways sliding engagement, which simplifies installation and removal of the air flow unit enclosures 5 for repair, upgrades, servicing etc.

In a further embodiment as depicted in FIGS. 1 and 2, the laterally extending support member 17 may comprise two laterally extending support beams that are spaced apart, in upstream/downstream direction, providing more stability to the air flow unit enclosures 5 mounted thereon.

As mentioned earlier, the convergent channel 12 may be a U-turn convergent channel having a first end comprising the channel intake end 10 of the convergent channel 12 and a second end comprising the channel discharge end 14 of the convergent channel 12. As depicted, such a U-shaped design of each of the air flow unit enclosures 5 allows for a convenient mounting arrangement, wherein the conveyor enclosure 2 comprises a laterally extending support member 17, e.g. two laterally extending, spaced apart support beams, and wherein the U-turn convergent channel 12 of each airflow unit enclosure 5 surrounds or encircles the support member 17. Through this embodiment each of the air flow unit enclosures 5 can be seen to at least partially wrap around the support member 17 by virtue of the U-turn shape of the convergent channel 12. Then to increase stability of each mounted air flow unit enclosure 5, an embodiment is provided wherein each air flow unit enclosure 5 comprises a protruding edge portion 5b arranged at the air intake 7, wherein the protruding edge portion 5b is shaped to hook behind the support member 17, or one of the two support beams thereof.

As mentioned hereinabove, a U-turn convergent channel 12 allows for a compact design of the air flow unit enclosures 5 whilst preventing waste items being sucked into the air intake 7 of an air flow unit 6 when, for example, waste items are being dumped into an entry area "E" upstream of the conveyor surface 4 and conveyor enclosure 2. Should a situation occur wherein some waste items still reach the air intake 7, then an embodiment may be considered wherein each of the air flow unit enclosures 5 further comprises a screen/mesh member 18 arranged in front of the air intake 7, thereby blocking waste items entering the air flow unit 6. The screen member 18 may, optionally, be removable and/or pivotally arranged to allow access to the air flow unit 6 if the need arises.

In a further aspect the present invention relates to a method of conveying waste items I at high speed, e.g. at speeds of 2, 3, 4 or 5 m/s or even higher. With reference to FIGS. 1 and 2, the method comprises the step of a) depositing waste items I on a moving conveyor surface 4. Note that waste items could optionally be deposited on a stationary conveyor surface 4 after which the conveyor surface 4 is being moved. Either way, at some point the conveyor surface 4 moves and waste items I are arranged/deposited thereon.

The method then comprises the step of b) providing a stream of air Q over/to the waste items I, wherein the stream of air Q has a velocity component Va which is substantially parallel to the conveyor surface 4 and has a magnitude which is substantially equal to a speed Vc of the conveyor surface 4.

As explained in light of the air flow system 1, the present method allows waste items I on a conveyor surface 4 to move in unison therewith at much greater speeds whilst experiencing no discernibly air resistance/drag as the provided stream of air Q substantially moves in unison with the waste items I and conveyor surface 4. This is particularly advantageous for light weight waste items I, such as plastic and/or paper waste items I, and in particular waste items having a relatively large surface area compared to their weight. For example, plastic and paper foil waste items are difficult to transport by means of the conveyor surface 4 at high speeds Vc, because air resistance will often cause loss of traction as a result of which plastic/paper foil slide across the conveyor surface 4 or even lift therefrom. Such erratic behaviour of waste items I during conveyance should be avoided as it limits waste system throughput.

In an advantageous embodiment, the step of b) providing a stream of air Q over/to the waste items I may comprise providing a laminar stream of air Q over/to the waste items. This laminar stream of air Q further reduces relative speed differences between the stream of air Q and the waste items I, so that the conveyor speed Vc is able to move with much greater speed without causing the waste items I to move, slide across or even lift from the conveyor surface 4.

In view of the above detailed description, the present invention can now be summarized by the following embodiments:

Embodiment 1

An air flow system (1) for a waste conveyor, comprising a conveyor enclosure (2) having a bottom side (3) configured for being mounted above a conveyor surface (4) at a predetermined surface clearance (C);
one or more air flow unit enclosures (5) mounted to the conveyor enclosure (2), wherein each airflow unit enclosure (5) comprises an airflow unit (6) having an air intake (7) and air exhaust (8),
wherein each airflow unit enclosure (5) comprises a divergent channel (9) having a channel intake end (10) fluidly connected to the air exhaust (8) and a channel discharge end (11) configured for providing a stream of air (Q) toward the conveyor surface (4),
wherein the divergent channel (9) comprises a widening cross section (Xd) in a downstream air direction (D) between the channel intake end (10) and the channel discharge end (11) of the divergent channel (9), and wherein the divergent channel (9) is arranged at an angle ($\alpha$) larger than 0° and smaller than 45° degrees with respect to the bottom side (3) of the conveyor enclosure (2).

Embodiment 2

The air flow system according to embodiment 1, wherein the divergent channel (9) is a straight divergent channel.

Embodiment 3

The air flow system according to embodiment 1 or 2, wherein each air flow unit enclosure (5) further comprises a convergent channel (12) having a channel intake end (13) fluidly connected to the air exhaust (8) and a channel discharge end (14) connected to the channel intake end (10) of the divergent channel (9),
wherein the channel intake end (10) of the divergent channel (9) comprises a smallest cross section (S) of the convergent channel (12) and divergent channel (9).

Embodiment 4

The air flow system according to embodiment 3, wherein the convergent channel (12) is a U-turn convergent channel having a first end comprising the channel intake end (13) of the convergent channel (12) and a second end comprising the channel discharge end (14) of the convergent channel (12).

Embodiment 5

The air flow system according to embodiment 3 or 4, wherein the convergent channel (12) is a smoothly arched U-turn convergent channel.

Embodiment 6

The air flow system according to any one of embodiments 3-5, wherein the convergent channel (12) and divergent channel (9) have rectangular cross sections.

Embodiment 7

The air flow system according to any one of embodiments 1-6, wherein a bottom edge (11a) of the channel discharge end (11) of the divergent channel (9) is flush to the bottom side (3) of the conveyor enclosure (2).

Embodiment 8

The airflow system according to any one of embodiments 1-7, wherein the conveyor enclosure (2) comprises a deflection member (15) extending from an upper edge (11b) of the channel discharge end (11) of the divergent channel (9) to the bottom side (3) of the conveyor enclosure (2).

Embodiment 9

The air flow system according to embodiment 8, wherein the deflection member (15) is pivotally connected to the conveyor enclosure (2).

Embodiment 10

The air flow system according to any one of embodiments 1-9, wherein each air flow unit enclosure (5) comprises substantially flat vertical side surfaces (5a).

Embodiment 11

The air flow system according to any one of embodiments 1-10, wherein each air flow unit enclosure (5) is removably mounted to the conveyor enclosure (2).

Embodiment 12

The air flow system according to any one of embodiments 1-11, when dependent on embodiment 4, wherein the conveyor enclosure (2) comprises a laterally extending support member (17) and wherein the U-turn convergent channel (12) of each air flow unit enclosure (5) surrounds, e.g. at least partially, the support member (17).

Embodiment 13

The air flow system according to embodiment 12, wherein each air flow unit enclosure (5) is arranged on the support member (17) in sliding engagement therewith.

Embodiment 14

The air flow system according to any one of embodiments 1-13, wherein each air flow unit enclosure (5) further comprises a screen member (18) arranged in front of the air intake (7).

Embodiment 15

A method of conveying waste items at high speed, comprising the steps of
a) depositing waste items (I) on a moving conveyor surface (4), and
b) providing a stream of air (Q) over the waste items (I), wherein the stream of air (Q) has a velocity component ($V_a$) which is substantially parallel to the conveyor surface (4) and has a magnitude which is substantially equal to a speed (Vc) of the conveyor surface (4),
wherein the step of b) providing a stream of air (Q) over the waste items (I) comprises providing a laminar stream of air (Q) over the waste items (I).

The present invention has been described above with reference to a number of exemplary embodiments as shown in the drawings. Modifications and alternative implementations of some parts or elements are possible, and are included in the scope of protection as defined in the appended claims.

The invention claimed is:

1. An air flow system for a waste conveyor, comprising a conveyor enclosure having a bottom side configured for being mounted above a conveyor surface at a predetermined surface clearance;
one or more air flow unit enclosures mounted to the conveyor enclosure, wherein each of the air flow unit enclosures comprises an air flow unit having an air intake and air exhaust,
wherein each of the air flow unit enclosures comprises a divergent channel having a channel intake end fluidly connected to the air exhaust and a channel discharge end configured for providing a stream of air toward the conveyor surface,
wherein the divergent channel comprises a widening cross section in a downstream air direction between the channel intake end and the channel discharge end of the divergent channel, and wherein the divergent channel is arranged at an angle larger than 0° and smaller than 45° with respect to the bottom side of the conveyor enclosure.

2. The air flow system according to claim 1, wherein the divergent channel is a straight divergent channel.

3. The air flow system according to claim 1, wherein each of the air flow unit enclosures further comprises a convergent channel having a channel intake end fluidly connected to the air exhaust and a channel discharge end connected to the channel intake end of the divergent channel,
wherein the channel intake end of the divergent channel comprises a smallest cross section of the convergent channel and divergent channel.

4. The air flow system according to claim 3, wherein the convergent channel is a U-turn convergent channel having a first end comprising the channel intake end of the convergent channel and a second end comprising the channel discharge end of the convergent channel.

5. The air flow system according to claim 3, wherein the convergent channel is a smoothly arched U-turn convergent channel.

6. The air flow system according to claim 3, wherein the convergent channel and divergent channel have rectangular cross sections.

7. The air flow system according to claim 1, wherein a bottom edge of the channel discharge end of the divergent channel is flush to the bottom side of the conveyor enclosure.

8. The air flow system according to claim 1, wherein the conveyor enclosure comprises a deflection member extending from an upper edge of the channel discharge end of the divergent channel to the bottom side of the conveyor enclosure.

9. The air flow system according to claim 8, wherein the deflection member is pivotally connected to the conveyor enclosure.

10. The air flow system according to claim 1, wherein each of the air flow unit enclosures comprises substantially flat vertical side surfaces.

11. The air flow system according to claim 1, wherein each of the air flow unit enclosures is removably mounted to the conveyor enclosure.

12. The air flow system according to claim 4, wherein the conveyor enclosure comprises a laterally extending support member and wherein the U-turn convergent channel of each of the air flow unit enclosures surrounds, at least partially, the support member.

13. The air flow system according to claim 12, wherein each of the air flow unit enclosures is arranged on the support member in sliding engagement therewith.

14. The air flow system according to claim 1, wherein each of the air flow unit enclosures further comprises a screen member arranged in front of the air intake.

* * * * *